United States Patent [19]
Bailey

[11] 3,757,197

[45] Sept. 4, 1973

[54] SERIES/PARALLEL COMPENSATED CURRENT SOURCE INVERTER WITH MEANS FOR CLAMPING VOLTAGE ON SERIES COMPENSATING CAPACITOR

[75] Inventor: Ronald B. Bailey, Waynesboro, Va.

[73] Assignee: General Electric Company, Philadelphia, Pa.

[22] Filed: July 25, 1972

[21] Appl. No.: 274,896

[52] U.S. Cl. ........ 321/45 C, 219/10.77, 307/252 M
[51] Int. Cl. ............................................. H02m 5/44
[58] Field of Search ................................ 219/10.77; 307/252 M; 321/45 R, 45 C

[56] References Cited
UNITED STATES PATENTS
3,703,676   11/1972   Frank ................................ 321/45 C Primary Examiner—A. D. Pellinen
Attorney—J. Wesley Haubner et al.

[57] ABSTRACT

In a current source inverter including a series compensating capacitor for supplying energy to a tank load and associated control circuit establishing a start up mode and a steady state mode of inverter operation, the former being a transitory mode of operation during which the inverter changes from a non-operating state to steady state operation, circuity is provided for clamping the voltage on the compensating capacitor to a very low magnitude at the end of the start up mode and during the steady state mode.

6 Claims, 2 Drawing Figures

SERIES/PARALLEL COMPENSATED CURRENT SOURCE INVERTER WITH MEANS FOR CLAMPING VOLTAGE ON SERIES COMPENSATING CAPACITOR

BACKGROUND AND OBJECTS OF THE INVENTION

The present invention relates to electric power apparatus useful for supplying high-frequency alternating current to "tanks" loads and more particularly it relates to means for effectuating reliable turn on and steady state operation of high-frequency inverters.

The following art now known to applicant is indicative of prior art approaches in this area of technology: U.S. Pat. Nos. 2,009,788 (Sabbah); 2,626,378 (Levy, Jr.); 2,652,528 (Demontvignier); and 3,599,078 (Pelley).

A "tank" load as used herein refers to a load circuit comprising the combination of resistance, inductance and capacitance. One example is a parallel-tuned circuit formed by connecting a bank of capacitors across an induction heating coil. Although the coil itself is highly inductive, the load circuit will nevertheless exhibit nearly unity power factor as a result of suitably dimensioning the parallel capacitance. Such tank loads in combination with high-frequency A-C power supplies are well known in the induction heating art.

With the commercial development of high-power solid-state controlled switching elements (often referred to as thyristors), there has been a growing interest in designing reliable and efficient static conversion apparatus employing such components for the purpose of supplying high-frequency alternating current in industrial heating applications.

The basic concept is to use a power inverter in tandem with a power rectifier. The rectifier converts readily available three-phase alternating current at a fixed, main frequency (e.g., 60 Hz.) into unidirectional current, and the inverter then changes the direct current into single-phase alternating current of controllable, high-frequency (e.g., 100 to 4,000 Hz.). In one advantageous form, such apparatus employs a parallel-compensated inverter in conjunction with a constant current source.

Parallel compensated inverters belong to the family of load commutated inverters and are well known to persons skilled in the art, as evidence by the above noted prior art patents of Sabbah and Demontvignier. When the respective load-current carrying thyristors of the inverter are cyclically triggered in a predetermined sequence and at a desired rate, the direction of current that is fed to the load circuit will alternate at a frequency determined by the triggering rate. With a square wave of current being thus switched into the tank load, an alternating voltage of sinusoidal wave form is developed thereacross.

In order for each thyristor to turn off at the end of its natural conducting periods, it needs to be subjected to a reverse voltage following conduction for an interval at least as long as the characteristic turn off of the device. In load commutated inverters, this requires that the switching action occur in advance of the zero-crossing of load voltage by an electrical angle whose time duration, at maximum operating frequency, is longer than the aforesaid turn off time. Toward that end, the load circuit should be tuned to have a leading power factor characteristic. This can be accomplished by suitably dimensioning the parallel capacitance in the tank load.

As is known this type of current-fed, parallel-compensated inverter cannot be started from a non-operating state by simply triggering its thyristors at a desired rate since the parallel compensated load is initially uncharged and insufficient voltage will build up thereacross to effectuate commutation upon starting. In view of this characteristic it has been a practice to utilize auxiliary start up circuitry in current fed parallel compensated inverters to effectuate start up (see the above noted Pelley patent).

It has been found that by connecting a compensating capacitor in series with a tank load, start up using prior art techniques is made somewhat easier since the series compensating capacitor will provide most of the commutation energy until the load is properly charged.

In my copending U.S. patent application, Ser. No. 274, 895, filed July 25, 1972, and assigned to the same assignee as the present application, there is shown and claimed means for effectuating turn on of a thyristor-composed, current-source inverter supplying a parallel compensated load connected via a series compensating capacitor (hereinafter called a current-fed, series/parallel compensated inverter) without necessitating auxiliary turn on circuitry like that utilized in the prior art.

Irrespective of the particular technique utilized to start up a current-fed, series/parallel compensated inverter it is desirable that the capacitance value of the series compensating capacitor be kept relatively small (low series compensating capacitance best effectuates good load isolation and more reliable start up). However, during steady state operation a large voltage may develop across a low-capacitance series compensating capacitor especially when the inverter is operating at lower frequencies. In view of the above characteristic, prior art current-fed, series/parallel compensated inverters are somewhat limited in their operating frequency range and power range.

It is a primary object of my invention to provide a current fed inverter supplying a series/parallel compensated load having a relatively wide frequency operating range.

It is a further object of my invention to provide a current fed inverter supplying a series/parallel compensated load of wider frequency and power range than comparable prior art inverters having low value series compensating capacitance.

SUMMARY OF THE INVENTION

In accordance with one aspect of my invention I provide in a current fed inverter supplying a parallel compensated load via a low capacitance value series compensating capacitor, controllable means for clamping the voltage on the capacitor to a very low magnitude after the inverter has been started. The clamping means also keeps the voltage on the capacitor clamped throughout steady state operation of the inverter.

DESCRIPTION OF THE DRAWINGS

While the specification concludes with claims particularly pointing out and distinctly claiming the subject matter that I regard as my invention, the invention will be better understood from the following description taken in conjunction with the accompanying drawing in which:

DETAILED DESCRIPTION OF THE PREFERRED EMBODIMENT

Figure 1:
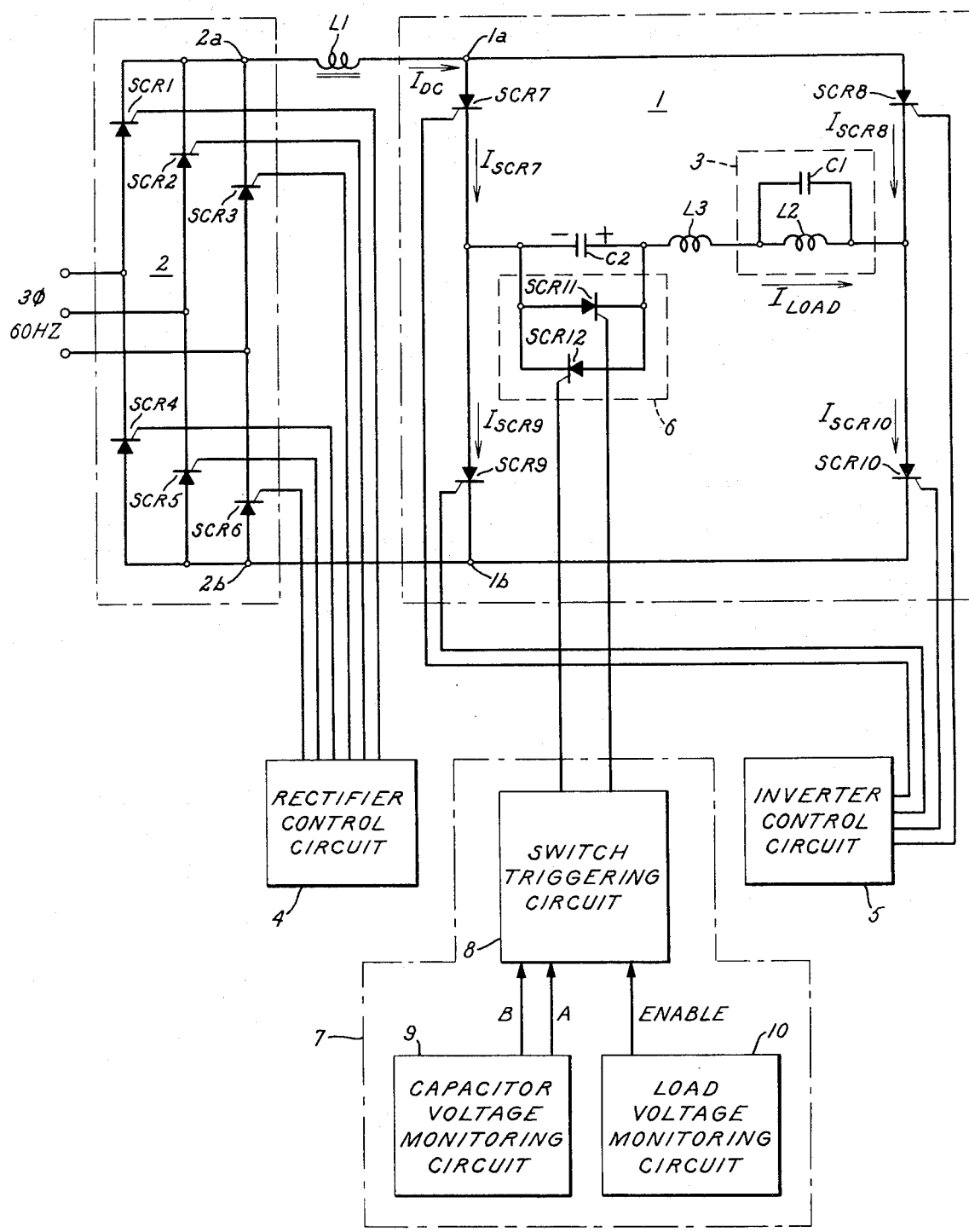
FIG. 1 is a schematic and functional block diagram of a power conversion apparatus embodying my present invention in its preferred form.

Referring to FIG. 1 a variable frequency, current-fed, inverter 1 in accordance with my invention is coupled to a rectifier 2 and is adapted for converting the direct current output of the rectifier into alternating current and for supplying the alternating current to a tank load 3. Tank load 3 includes an inductor L2 (which may represent an induction heating coil) shunted by a parallel compensating capacitor C1. The inverter 1 includes a pair of input terminals 1a and 1b, terminal 1a being coupled through a smoothing inductor L1 to one D-C output terminal 2a of rectifier 2 and terminal 1b being coupled directly to the other rectifier D-C output terminal, 2b. The rectifier 2 and the smoothing inductor L1 form the D-C source for inverter 1.

Rectifier 2 is a phase-controlled rectifier and comprises six thyristors or SCR's, SCR 1, SCR 2, SCR 3, SCR 4, SCR 5 and SCR 6 which are connected to form a six-pulse bridge connected rectifier. The average voltage of the D-C output across the terminals 2a and 2b can be adjusted by suitable phase delay triggering of the rectifier thyristors. To that end a control circuit 4 is provided. The output of control circuit 4 is coupled to the gate electrodes of the rectifier thyristors for cyclically triggering them into conduction at any desired phase delay angle. The output of rectifier 2 consists of a D-C voltage including a 360 hz. ripple. As is common the smoothing inductor L1 is coupled to the rectifier output terminals to smooth the rippled output current so as to provide a constant direct current, denoted as $I_{DC}$, to the inverter.

Inverter 2 is a series/parallel compensated inverter like that described in my aforenoted copending application. As is known such inverters are formed by appropriately interconnecting and cyclically triggering in a prescribed sequence a plurality of main switching elements (e.g., thyristors). To that end inverter 2 comprises 4 thyristors, SCR 7, SCR 8, SCR 9 and SCR 10. As can be seen the cathode of SCR 7 is connected to the anode of SCR 10 via the series connection of a low capacitance value series compensating capacitor C2, an inducator L3 and a load 3. The series connection of SCR 7, capacitor C2, inductor L3, load 3 and SCR 10 forms a first main current path through which $I_{DC}$ will flow when the path's thyristors are rendered conductive. The cathode of SCR 8 is connected to the anode of SCR 9 via the series connection of capacitor C2, inductor L3 and load 3. The series connection of these elements forms a second main current path through which $I_{DC}$ will flow when the path's thyristors are rendered conductive. By alternately triggering the two path's thyristors in a prescribed sequence the direct current will be made to cyclically change directions through the load to establish alternating current therein. The frequency of the alternating load current will depend upon the triggering rate of the thyristors forming the main current paths.

The triggering rate or frequency at which the inverter's thyristors are gated is established by inverter control circuit 5. Control circuit 5 provides a first train of short duration pulses at an established repetition rate to the gate electrodes of SCR 7 and 10 and a second train of short duration pulses to the gate electrodes of SCR's 8 and 9. The second train of short duration pulses is at the same repetition rate as the first train but is displaced in time therefrom by one half of the interval between the pulses of the first train. The pulse trains may be conveniently provided by the set and reset outputs of a flip-flop (not shown) which is made to change states at a frequency twice that of the desired triggering frequency.

As previously noted parallel-compensated, load-commutated inverters cannot be started "cold" due to the absence of sufficient load voltage to commutate current from one current path to the other to produce the desired alternating current output. By utilizing auxiliary circuitry to charge the load one is able to start a parallel compensated inverter without too much difficulty. In a series/parallel compensated inverter wherein a compensating capacitor is connected in series with a parallel compensated load, starting can be effectuated much more easily.

In my aforenoted copending application I disclose and claim a novel and efficient technique for starting a series/parallel compensated inverter made up of switching elements forming two main current conducting paths without requiring additional starting circuitry. That technique involves initially rendering the elements forming one main path conductive in response to an ON command so that direct current can flow therethrough and charge the series compensating capacitor, subsequently rendering an element of the other main path conductive to form an auxiliary path into which said direct current is diverted and increases in magnitude, and thereafter rendering the elements forming each of said main paths alternately conductive at a desired frequency starting with the elements of said other main path, whereupon the prior charge on the series compensating capacitor causes the auxiliary path to cease conducting direct current when the elements of said other path are first rendered conductive and whereupon the alternate conduction of the elements of said main paths enables alternating current to flow through the load. The voltage which appears on the series compensating capacitor during the alternate conduction of the main current paths is effective to commutate the current from one path to the other until the load is charged sufficiently to take over that task.

In a series/parallel compensated inverter, a series compensating capacitor having relatively low capacitance aids starting. As is known, when an inverter is started from a non-operating or "OFF" state, load current builds up slowly. For a given level of load current more voltage will build up on a capacitor of low capacitance than a capacitor of large capacitance, and the larger voltage will be more effective in commutating the current through the inverter.

Once a series/parallel compensated inverter has been started and is operating at steady state, excessive voltage may build up on the low capacitance series compensating capacitor particularly at lower frequencies (e.g., less than 1,000 hz.). This action may necessitate the use of thyristors having a higher rating than required for steady state operation if no series compensating capacitor were utilized in order to preclude the possibility of a thyristor breakdown. To obviate such problems I provide, in a series/parallel compensated inverter whose series capacitor is of a low capacitance value, means for removing the effect of such low capacitance from the inverter during steady state operation. In so doing I am able to provide an inverter having a greater frequency and power range than comparable prior art series/parallel compensated inverters.

To that end I provide a switch which is connected in shunt with the series compensating capacitor C2.

In starting the inverter from its OFF state, switch 6 is maintained in a non-conductive state so that the voltage which appears on capacitor C2 can effectuate commutation until the load is sufficiently charged to effectuate commutation on its own. Once the load is charged sufficiently, switch 6 is rendered conductive. This action clamps the voltage on the low value series compensating capacitor to a very low magnitude (approximately 1 volt) thereby minimizing inverter loading and precluding the build up of excess voltage on its thyristors.

As can be seen switch 6 includes a pair of thyristors or SCR's 11 and 12, connected in an inverse parallel relationship with one another. The triggering of SCR's 11 and 12 is controlled by switch control means 7. Switch control means 7 includes a switch triggering or actuating circuit 8, which is adapted for supplying trigger signals to the proper switch thyristor in response to a command from a capacitor voltage monitoring circuit 9 once it is enabled by a signal from the load voltage monitoring circuit 10.

Figure 2:
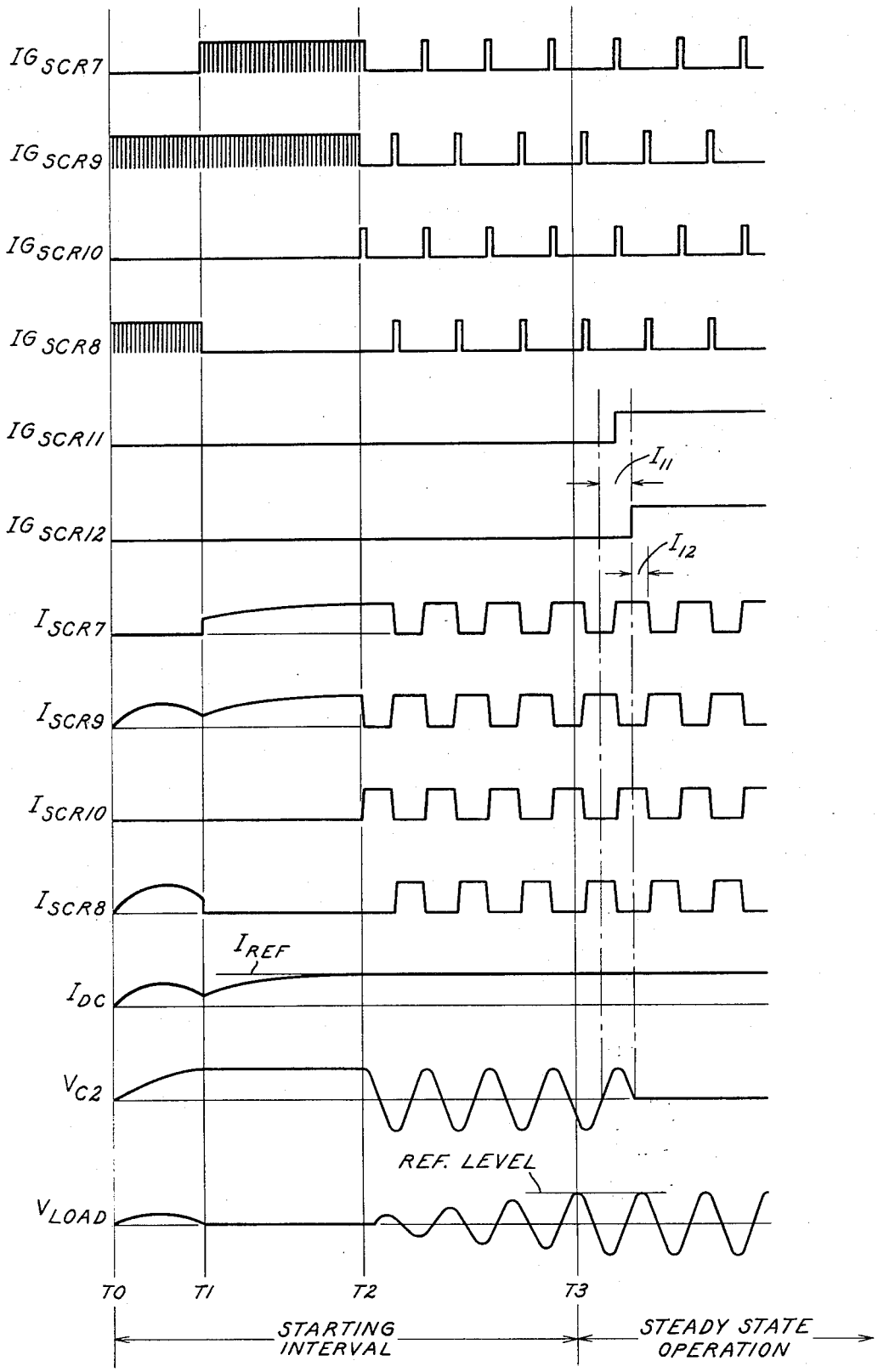
FIG. 2 is a graphical representation of current and voltage wave forms in certain portions of the circuit shown in FIG. 1.

Operation of my invention will be better understood with reference to the graphs of FIG. 2 as well as the schematic and functional block diagram of FIG. 1.

The graphs of FIG. 2 show currents and voltages in various parts of the system shown in FIG. 1 as the inverter changes from its non-operating (off) state to steady state operation. The starting technique utilized and shown is the technique which is the subject matter of my aforementioned copending application and is as follows: At time TO an "ON" command is provided to the inverter 1 and rectifier 2 to cause them to commence operation. At this time inverter control circuit 5 provides high frequency unidirectional signals to the gate electrodes of SCR's 8 and 9 (such signals being denoted as $IG_{SCR8}$ and $IG_{SCR9}$, respectively, in FIG. 2) to render SCR's 8 and 9 conductive. The DC current from rectifier 2, i.e., $I_{DC}$, builds up and flows through the path consisting of SCR 8, load 3, inductor L3, series compensating capacitor C2 and SCR 9. The current which flows thorough SCR's 8 and 9 is denoted as $I_{SCR8}$ and $I_{SCR9}$, respectively and is shown in FIG. 2. The current flowing through SCR's 8 and 9 charges capacitor C2 in a direction indicated by polarity marks shown in FIG. 1 and to a preselected voltage magnitude. The voltage appearing on capacitor C2 is denoted as $V_{C2}$ and is shown in FIG. 2, and positive polarity at FIG. 2 is that indicated in the drawing at FIG. 1. At the time in the direction shown by the arrow in FIG. 1, the voltage $V_{C2}$ attains the preselected level, inverter control circuit 5 provides high frequency or D.C. gate signals, denoted at $IG_{SCR7}$ and $IG_{SCR9}$ to SCR's 7 and 9, respectively and removes the gate signals $IG_{SCR8}$ from SCR 8, whereupon SCR 7 begins conducting, SCR 9 continues conducting, and SCR 8 is commutated off. The conduction of SCR's 7 and 9 provides an auxiliary conducting path into which the direct current is diverted. During the interval that SCR's 7 and 9 conduct, the magnitude of input current $I_{DC}$ builds up to a preselected constant level, $I_{REF}$, through the auxiliary path. When $I_{DC} = I_{REF}$ control circuit 5 removes the gate signals on SCR 9 and provides short duration gate pulses to SCR 7 and 10. These pulses are the first pulses of a train of pulses having a preselected repetition rate determined by the inverter control circuit. Upon receipt of gate pulses SCR 7 and 10 begin to conduct whereupon the voltage on capacitor C2 causes SCR 9 to turn off and current $I_{LOAD}$ begins to flow through the load 3. The current flowing through the load begins to charge it up. The current flowing through capacitor C2 via conducting SCR's 7 and 10 causes capacitor C2 to begin to discharge from its previously positively charged state. At the time when the voltage on capacitor C2 becomes zero, current is still flowing through the path made up of conducting SCR's 7 and 10 and the charge on C2 reverses. A short time thereafter control circuit 5 provides short duration pulses, $IG_{SCR8}$ and $IG_{SCR9}$ to the gate electrodes of SCR's 8 and 9, respectively, said pulses being the first of a train of pulses which is of the same repetition rate as the pulses of $IG_{SCR7}$ and $IG_{SCR9}$ but lagging by one-half cycle therefrom. When SCR's 8 and 9 are triggered they begin conducting and at the same time the negative voltage appearing on capacitor C2 causes SCR7 and 10 to cease conducting. This action results in current $I_{LOAD}$ flowing through the load in the opposite direction as the arrow shown in FIG. 1 and capacitor C2 begins to discharge (i.e., charge in the positive direction). At the occurrence of the second pulse of $IG_{SCR7}$ and $IG_{SCR10}$ the voltage on capacitor C2 will have charged to a positive polarity whereupon SCR 7 and 10 begin conducting and SCR's 8 and 9 turn off. This action results in current $I_{LOAD}$ reversing direction in the load to flow in the direction of the arrow shown in FIG. 1. The next of the train of trigger pulses will cause SCR's 8 and 9 to turn on and SCR 7 and 10 to turn off, whereupon load current will again reverse. The above described inverter operation will continue as long as the control circuit provides the trigger pulse trains.

When the voltage to which the load is charged is of sufficient magnitude to effectuate commutation on its own the inverter is said to be operating at steady state. The interval of time between time TO and the commencement of steady state operation is denoted as the start up interval or period. As should be appreciated during the starting interval it is the voltage $V_{C2}$ on capacitor C2 and not the voltage on the load which effectuates commutation of current from one current path through the other, since the load voltage during the starting interval is of insufficient magnitude for commutation duty.

In FIG. 2, time T3 represents the point at which the inverter begins its steady state mode of operation. The interval between time $T_0$ and T3 is the heretofore described start up interval. During the start-up interval the inverter operates in what can be called its start up mode of operation.

The load voltage monitoring circuit 10 monitors the instantaneous peak magnitude of the load voltage $V_{LOAD}$, and at the time, T3, that the load voltage attains a preestablished reference level (which level is sufficient for load-effectuated-commutation) the circuit 10 latches in and provides an "enable" signal to the switch triggering circuit 8. The "enable" signal conditions switch triggering circuit 8 for operation in response to receipt of a "command" signal. When the voltage on capacitor C2 is of positive polarity, at which time SCR 11 is reverse biased, monitoring circuit 9 provides a "command" signal A to triggering circuit 8. In response to the command signal A, the enabled circuit 8 supplies a continuous D-C trigger signal to the gate electrode of SCR 11. When the polarity of the voltage on capacitor C2 reverses SCR 11 begins conducting the current flowing through SCR's 7 and 10 around capacitor C2 whereupon the voltage on capacitor C2 is clamped at a very low magnitude (approximately 1 volt). In response to the clamping of the voltage on capacitor C2, monitoring circuit 9 provides a "command" signal B to triggering circuit 8. Upon receipt of this command signal, circuit 8 provides a continuous D-C trigger signal to the gate electrode of SCR 12. Upon commutation of current from SCR's 8 and 9, SCR 12 begins conducting. This action prevents capacitor C2 from being charged by the current flowing through SCR's 8 and 9 (i.e., it keeps the voltage thereon clamped).

Switch triggering circuit 8 continues to supply the continuous gate signals to SCR's 11 and 12 throughout steady state operation so that SCR's 11 and 12 alternately conduct during such operation to keep the voltage on capacitor C2 clamped.

In FIG. 2 I have shown an interval, denoted as $I_{11}$ during which interval SCR 11 should be triggered. As can be seen this interval corresponds to the interval during which reverse voltage appears on SCR 11. As should be appreciated by those skilled in the art although SCR 11 is triggered during this interval it will not turn on until the voltage on capacitor C2 reverses polarity. In turning on at that time the di/dt on the thyristor is relatively low.

I have also shown in FIG. 2 the interval, $I_{12}$ during which SCR 12 should be triggered in order to prevent the charging of capacitor C2 and in the interest of keeping the di/dt on SCR 12 low when it turns on. As can be seen interval $T_{12}$ begins at the termination of interval $I_{11}$ and terminates when current commutates from SCR's 7 and 10 to SCR's 8 and 9.

While I have shown and described a particular embodiment of my invention, it will be obvious to those skilled in the art that various changes and modifications may be made without departing from my invention in its broader aspects; (e.g., control circuit 9 may provide a command signal A when $V_C = 0$) and I, therefore, intend herein to cover all such changes and modifications as fall within the true spirit and scope of my invention.

What I claim as new and desire to secure by Letters Patent of the United States is:

1. In an electric power conversion system including a current source inverter for supplying energy to a tank load comprising a bridge circuit having first and second current paths, each of said paths including first and second thyristors, said load being connected in series with a compensating capacitor of relatively low capacitance between the first and second thyristors in each path, and control means operative for actuating the inverter from a non-operating, OFF, state and for controlling its operation once actuated, said control means establishing a transitory start up mode of operation in which the inverter changes from its OFF state to a steady state mode of operation during which alternating current flows through the load via the alternate conduction of said current paths, the improvement comprising: means for clamping the voltage appearing on the compensating capacitor to a very low magnitude in the beginning of the steady state mode of operation and for keeping the voltage thereon clamped throughout said steady state mode of operation.

2. The system as specified in claim 1 wherein said voltage clamping means comprises electric switch means connected in shunt with said capacitor, said switch means being in a non-conductive state prior to steady state operation, and further control means for actuating said switch means to a conductive state in the beginning of said steady state mode of operation.

3. The system as specified in claim 2 wherein said further control means also comprises means for monitoring the voltage appearing on the load and for enabling said actuating means to render said switch conductive when the load voltage attains a predetermined magnitude at the beginning of steady state operation.

4. The system as specified in claim 2 wherein said switch means comprises first and second thyristors connected in inverse parallel relationship with one another.

5. The system as specified in claim 4 wherein said further control means also comprises first means for monitoring the voltage appearing on the load and for enabling the operation of the actuating means when the load voltage attains a predetermined magnitude and second means for monitoring the polarity of the voltage appearing on the compensating capacitor and for causing the enabled actuating means to supply a trigger signal to said first thyristor prior to the point in time when said thyristor is forward biased, whereupon said thyristor becomes conductive when forward biased to clamp the voltage appearing on said capacitor to a low magnitude.

6. The system as specified in claim 5 wherein said second means thereafter causes the enabled actuating means to supply a trigger signal to said second thyristor after said first thyristor becomes conductive and prior to the point in time when said second thyristor is forward biased, whereupon said second thyristor becomes conductive when forward biased to clamp the voltage appearing on said capacitor to a low magnitude.

* * * * *